United States Patent [19]

Pitschi

[11] 4,135,288

[45] Jan. 23, 1979

[54] METHOD OF SECURING HF-COAXIAL CONNECTOR WITH A COUPLING RING

[75] Inventor: Franz X. Pitschi, Rottach-Egern, Fed. Rep. of Germany

[73] Assignee: Spinner GmbH, Fed. Rep. of Germany

[21] Appl. No.: 716,580

[22] Filed: Aug. 23, 1976

[30] Foreign Application Priority Data

Oct. 20, 1975 [DE] Fed. Rep. of Germany ....... 2546942

[51] Int. Cl.[2] .............................................. B23P 11/00

[52] U.S. Cl. ........................................ 29/443; 29/511; 29/520; 285/256; 285/382; 339/89 C

[58] Field of Search ................. 29/511, 520, 437, 443; 285/382, 256; 339/89 C

[56] References Cited

U.S. PATENT DOCUMENTS

| | | | |
|---|---|---|---|
| 244,446 | 7/1881 | Gilmore | 285/382 X |
| 244,804 | 7/1881 | Gillespie | 29/511 UX |
| 2,069,141 | 1/1937 | Furlong | 29/520 UX |
| 2,498,395 | 2/1950 | Coss | 285/382 X |
| 2,574,625 | 11/1951 | Coss | 285/382 X |
| 2,926,029 | 2/1960 | St. Clair et al. | 285/282 X |
| 3,512,810 | 5/1970 | Harris | 285/256 |
| 3,644,874 | 2/1972 | Hutter | 29/511 X |
| 3,673,547 | 6/1972 | Ziegler | 285/382 X |

*Primary Examiner*—Charlie T. Moon
*Attorney, Agent, or Firm*—Ostrolenk, Faber, Gerb & Soffen

[57] ABSTRACT

An HF-coaxial connector including a connector body and a coupling ring outside the connector body: the connector body has an outwardly projecting flange; the coupling ring has an internally projecting flange and the flanges respectively project outwardly and inwardly sufficiently that the flanges lock to block separation of the connector and coupling ring; and a process for forming the connection by deforming the coupling ring inwardly to define the flange which engages the connector body.

1 Claim, 2 Drawing Figures

METHOD OF SECURING HF-COAXIAL CONNECTOR WITH A COUPLING RING

This invention relates to an HF-coaxial connector with a coupling ring, of which an inner flange is supported in form-locking manner by an outer flange of the connector body. Connections of this kind, which are secured by coupling rings, afford protection against axial tensile forces and, by virtue of the axial bracing effect, guarantee favourable contact making in a defined, permanent manner. The production of these connectors with coupling rings does not involve any difficulties in cases where the coupling ring is fitted onto the connector body from behind, i.e. from the cable end. In order, with connectors of this type, permanently to fit the coupling ring onto the connector body before fastening to the cable, it is common practice to provide the outer flange of the connector with a screwthread corresponding to the mother thread of the coupling ring, so that after the coupling ring has been screwed on over this flange the coupling ring is prevented from dropping out backwards. In numerous applications, however, it is not possible to fit the coupling ring onto the connector body from behind. This is always the case when, behind its outer flange, the connector body comprises parts which have a larger diameter than this external flange or when the diameter of the internal screwthread of the coupling ring is smaller than the outer flange of the connector body. In order, with connectors of this kind, to support the coupling ring in form-locking manner, a snap ring has hitherto been inserted into a groove, for example in the connector body, and the snap ring compressed when the coupling ring is pushed on from the front. It is also possible to introduce a snap ring into the groove of the coupling ring and to spread it outwards whilst the coupling ring is guided from the front by way of a flange of the connector body. It is also possible for the snap ring to engage in a groove of the connector body and coupling ring. The disadvantage of these constructions is that, between the radially inner surface of the snap ring and the base of the outer groove in the inner component or between the radially outer surface of the snap ring and the base of the inner groove of the coupling ring, there remains an empty radial annular space into which the snap ring can be forced under heavy axial load, so that it is no longer supported by the two ring stages and the form-locking connection is broken.

In order to obviate these disadvantages, it is known from West Germany offenlegungsschriften Publication DT-OS No. 2,211,451 that the outer groove of the connector body or the inner groove of the coupling ring, which radially support the snap ring on both sides in form-locking manner, can be made open to the rear or to the front and adjoined by widening in such a way that, when the bracing component is axially displaced, the snap ring is forced by way of the widening into the opposite groove limited axially on both sides. In the braced position, the retaining ring engages fully in both grooves and cannot be radially displaced, even under heavy axial load. The only disadvantage of this known construction is the fairly elaborate shaping of the connector body and coupling ring in the fixing zone.

Accordingly, the object of the present invention is to provide an HF-coaxial connector with a coupling ring which can be pushed onto the connector from the front, guarantees a firm form-locking fit and can be used in particular for relatively small HF-connections.

According to the invention, this object is achieved by virtue of the fact that the sleeve-like end of the coupling ring which carries the inner flange is flanged onto the outer flange of the connector body. The inner flange of the coupling ring which is drawn inwards by the flanging operation is thus supported in form-locking manner behind the outer flange of the connector body.

In one preferred embodiment of the invention, the connector is produced by pushing the inner flange of the coupling ring, of which the internal diameter exceeds the external diameter of the connector body, over the connector body and its outer flange from the front and subsequently forming the sleeve-like section which carries the inner flange onto the outer flange to form a conical transition section, the inner flange being simultaneously compressed in the radial direction so that it comes to rest axially behind the outer flange.

The sleeve-like end section with the inner flange is best deformed by rolling using a suitable support. Instead of this, the sleeve-like end section can be drawn inwards over the entire periphery in a single operation by simultaneous radial squeezing.

One embodiment of the invention is described by way of example in the following with reference to the accompanying drawings, wherein.

Figure 1:
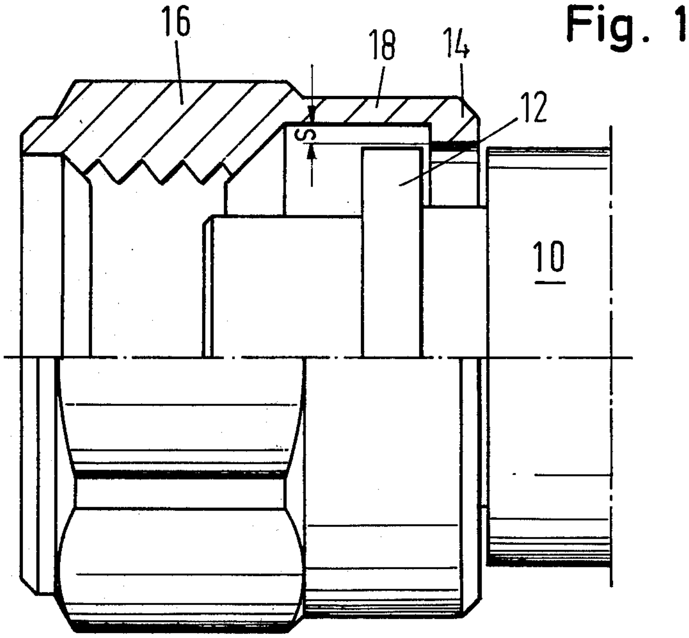
FIG. 1 shows the front part of a coaxial connector with a coupling ring before deformation.
Figure 2:
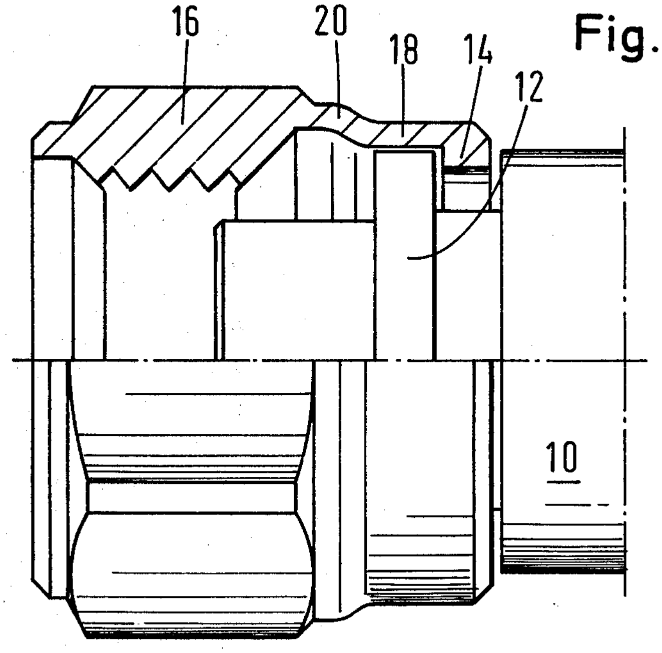
FIG. 2 shows the connector illustrated in FIG. 1 ready for use.

The connector body 10 is provided with an outer flange 12, behind which the inner flange 14 of a coupling ring 16 is supported in form-locking manner when the connector is ready for use. In the embodiment illustrated, the connector body 10 is substantially equal in diameter at its rear end to its outer flange 12, so that the coupling ring 16 cannot be pushed on from behind, i.e. from the cable end. In the embodiment illustrated, the coupling ring would also be prevented from being pushed on from behind by the small diameter of the internal thread of the coupling ring, because the diameter of this internal thread is smaller than the diameter of the outer flange 12. According to the invention, therefore, the coupling ring is initially made in such a way that the internal diameter of the inner flange 14 is equal to or larger than the external diameter of the outer flange 12 of the connector body. The coupling ring 16 can then be pushed over the connector body 10 from the left, as shown in FIG. 1. In the position shown in FIG. 1, a flanging tool, in the form of rollers, or a squeezing mechanism acts on the sleeve-like end section 18 of the coupling ring which carries the internal flange 14, deforming it by the radial amount s of the inner flange depth, so that this sleeve-like end section 18 comes to rest on the outer flange 12, the inner flange 14 simultaneously being drawn inwards in the radial direction so as to form a conical transition section 20. In this position (illustrated in FIG. 2), the coupling ring 16 is permanently joined to the connector body, in addition to which easy assembly with firm axial bracing is guaranteed.

I claim:

1. A process for permanently securing a coupling ring onto an HF coaxial connector, comprising:
   providing a connector body having an outer flange with a first external diameter, over which outer flange a coupling ring is to be past;

providing a coupling ring having a sleeve-like end section, into which said outer flange of said connector body is to be past, said sleeve-like end section having a second uniform outer diameter and terminating in an inner flange which is to be fastened behind said outer flange of said connector body for thereby coupling said coupling ring to said connector body; said inner flange having a first internal diameter which is greater than said first external of said coupling ring outer flange, said sleeve-like end section having a second internal diameter which is greater than said first internal diameter of said inner flange, said coupling ring also having an internally threaded section having a third internal diameter which is less than said first external diameter of said outer flange adjacent said sleeve portion;

passing said connector body outer flange past said coupling ring inner flange and inside said sleeve-like end section; and then compressing, by rolling, only a portion of said sleeve-like end section radially inward to form a cylindrical portion having a third uniform outer diameter which is less than said second uniform outer diameter of said sleeve like end section such that a conically tapered transition portion is formed between the portion of said sleeve-like end section which is not compressed by rolling and said portion of said sleeve-like end section which is compressed by rolling, said third uniform outer diameter of said compressed portion of said sleeve-like end section being sufficiently small that said inner flange comes to rest beyond said outer flange with a third internal diameter that is smaller than said first external diameter of said outer flange.

* * * * *